United States Patent Office 3,471,173
Patented Oct. 7, 1969

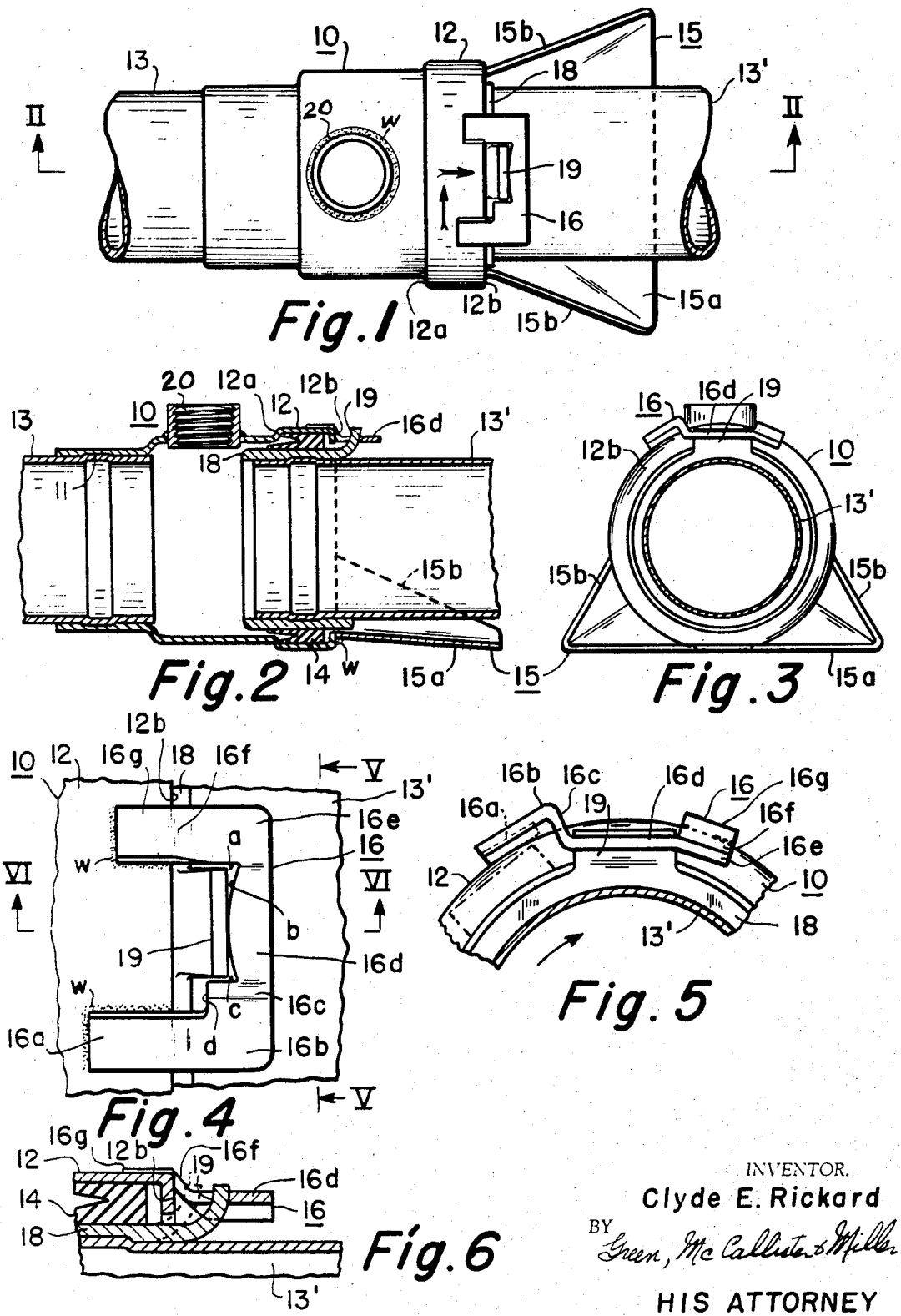

3,471,173
SOLID SET COUPLING
Clyde E. Rickard, Du Bois, Pa., assignor to McDowell Manufacturing Company, Du Bois, Pa., a corporation of Pennsylvania
Filed Dec. 6, 1967, Ser. No. 688,616
Int. Cl. F16l 37/08, 55/00
U.S. Cl. 285—6
3 Claims

ABSTRACT OF THE DISCLOSURE

A quick connect and release, push and pull type of latching coupling is provided for removably-securing adjacent end portions of a pair of fluid coupling members together which employs a nose part having a latching lug and a cooperating housing body part having an open mouth portion and carrying a latch of bifurcated shape for receiving the latching lug of the nose part. The construction involves the use of a cooperating bottom stabilizing part or stand which has an opposed positioning with respect to the latching lug and latch parts in such a manner that the parts can be effectively and easily aligned for and rotated into a preliminary latching relation, and can then be pulled or moved outwardly with respect to each other into a final latching position. The cooperative construction is such that the final locking position is stable and cannot be lost, although the coupling permits both up and down or vertical axial tilting and a limited sidewise or horizontal tilting of the pipe members with respect to each other. The stabilizer has a cooperative functioning to not only guide the nose part and its latching lug into an accurately aligned position for rotative latching movement, but also importantly, to prevent any form of tilting removal of the latching engagement.

---

This invention relates to an improved, so-called solid set type of coupling employing complementary male and female fittings in the form of a housing body part and a nose part, as respectively mounted on open end portions of a pair of fluid-carrying pipe or conduit members that are to be connected and disconnected with respect to each other. A phase of the invention pertains to a coupling construction that is foolproof in operation and that is particularly suitable for an irrigation system that carries fluid under pressure and utilizes connected sections of pipe members laid on an irregular contour such as the ground.

There have been various types of fitting or coupling assemblies for more or less temporary or semi-permanent type of fluid-carrying pipe systems. There, however, has been a need for a quickly connected-disconnected type of coupling which will provide for an angular or pivotal action about the axis of or throughout the periphery of the joint without endangering a latched relationship of the parts with respect to each other and while enabling an effective fluid seal when fluid pressure is applied.

It has thus been an object of the invention to devise a coupling of a so-called solid set type which is constructed to conveniently accommodate its coupled parts to reasonable ground level configurations.

Another object of the invention has been to develop a new concept in the coupling for a pair of hollow, fluid-carrying members that assures an easy and quick connecting and disconnecting of the parts thereof when fluid pressure is turned off, but which will positively prevent an accidental or inadvertent release of the members when fluid pressure is being applied.

A further object of the invention has been to provide a reliable and practical fluid type coupling assembly which will enable a slight radial or angular deviation of the joint therebetween to accommodate for an irregular land contour.

A still further object of the invention has been to devise an improved coupling joint assembly of a positive latching type in which the latching elements are located in a diametrically opposed relation with respect to a position retaining base support for the assembly.

These and other objects of the invention will appear to those skilled in the art from the illustrated embodiment and the claims.

In the drawings,

FIGURE 1 is a top plan view of a coupling assembly or apparatus devised in accordance with the invention, shown in a final, positive-latching connected relation.

FIGURE 2 is a side section in elevation on the same scale as and taken along the line II—II of FIGURE 1; in this figure, the coupling parts are also shown in their fully or final, positive-latching relation.

FIGURE 3 is an end view in elevation on the scale of FIGURES 1 and 2 and taken through the right hand conduit of FIGURE 2; this view also shows the coupling parts in their final latched relation.

FIGURE 4 is an enlarged fragmental top view showing details of the construction and operating relation between latching parts of the couplings 1, 2 and 3 when they are in the final latched position.

FIGURE 5 is a fragmental front or end section on the scale of and taken along the line IV—IV of FIGURE 4.

And, FIGURE 6 is a fragmental vertical section on the scale of and taken along the line VI—VI of FIGURE 4, illustrating in full lines the latching parts in a final latching poistioning and, in dotted lines, an intermediate position with respect to each other.

Referring particularly to FIGURES 1, 2 and 3 of the drawings, a pair of endwise-positioned, relatively thin-wall, pipe, tubing or conduit members 13 and 13' are respectively provided with a housing body or fitting part 10 and a male nose fitting or part 18. The housing body part 10, as shown in FIGURE 2, is secured in a suitable manner at one end by an expanded-out joint 11 on the open end of one pipe member 13 to extend forwardly thereof. The housing body or fitting part 10 has an enlarged, annular, open mouth portion 12 adapted to receive a conventional U-shaped, fluid pressure sensitive, sealing gasket of resin or rubber-like material 14 therein. The gasket 14 is retained in position by an outwardly-offset connecting shoulder 12a and by an inwardly-projecting front rim, flange or edge portion 12b of the open mouth portion 12. As shown in FIGURES 1, 2 and 3, a female outlet or fitting 20 may be secured, as by weld metal w, to extend upwardly from the body part 10 for carrying a conventional overhead water spray assembly.

A shovel-nose shaped stabilizing part or support stand 15 is secured, as by weld metal w (see FIGURE 2), to form an integral base support for the housing body 10 and to extend outwardly-forwardly in a slight downward, outward inclined relation with respect to and from the front flange or rim portion 12b. The stabilizing base, part or stand 15, as shown particularly in FIGURE 3, has a substantially flat or planar base portion 15a, and smoothly turned or curved side wing portions 15b which follow the rounded contour of the front rim or flange 12b. The stabilizing base 15 serves to support the pipe member 13 and the body part 10 in a turn-resisting relationship on the ground level, and as an alignment and guide means for introduction of the nose part 18 within the housing body part 10. The side curved wings 15b give stability to the stand and serve as side limit guides during introduction and removal of the nose part 18.

The nose part 18 is shown secured by an expanded or pressed-out joint on the forward end of pipe or tubing member 13' in a manner similar to the joint 11 between the housing body 10 and the pipe member 13. The nose part 18 is shown of hollow generally cylindrical shape and as having a backwardly-upwardly sloped and extending latching lug, tab or tongue portion 19 thereon to cooperate with a latch or latching bracket element 16 of a C or bifurcated shape that is secured, as by weld metal *w*, on the outer wall of the open mouth portion 12 to project forwardly therefrom. It will be noted that the latch or latching element 16 has an opposed, upper position with respect to the support stand 15. This, as will be apparent from a study of the drawings, gives it an improved stability in its latched relation and provides a better supporting connection between the two fitting parts thereof. Since the distance or spacing between nose part 18 and the base 15 is less than the projection of lug 19 above 16 (see FIGURE 2), it is not possible to release the latching relation by tilting conduit 13' and nose part 18 downwardly the maximum distance that is permitted by the base 15.

Referring particularly to FIGURES 4, 5 and 6, the latch or latching bracket element 16 has a pair of opposed and peripherally spaced-apart, tab-like legs 16a and 16g. Left hand leg 16a extends forwardly substantially parallel to the portion 12 and is connected by a slight radially-outwardly or upwardly-offset front end portion 16b and a downwardly or radially-inwardly curved offset shoulder 16c to a cross-extending, front, closing end or tab piece 16d. The front piece 16d serves, as shown in FIGURE 4, as a positive limit stop for latching tongue 19 of the nose part 18 and extends on a plane that is substantially tangential to the opening through the front flange 12b of the housing body 10. The other end of the front piece 16d is connected by a portion 16e that has a slope somewhat corresponding to the slope of the curvature of the opening through the flange 12b; it has a more radial-inward positioning than the leg portions 16a and 16b and is connected through a radially-outwardly sloped, shoulder portion 16f to a planar mounting leg portion 16g.

In using the joint or coupling assembly disclosed, the pipe or conduit member 13' is moved endwise towards the pipe member 13 with the latching tab 19 of its nose part 18 in a position to the left of the latch 16 and as guided by the shovel nose stand or support 15. This inward movement is continued until the nose part 18 extends longitudinally or axially inwardly within gasket 14, as limited by engagement of the latching tab 19 with the front face or flange 12b of the open mouth portion 12. In the next step, the conduit 13' is turned clockwise with respect to the conduit 13, whereby the latching tab 19 passes under the leg 16a, back of edge *d* (see FIGURE 4), and the side edge of the tab 19 engages inner edge *a* of the leg portion 16e. The tab 19 is thus aligned within the latching area of the latch 16, as defined by edge portions *a*, *b* and *c*. At this time, the conduit 13' may be pulled axially-outwardly with respect to the conduit 13 and its housing body 10, until the front face of the latching tab 19 engages the convex edge *b* of the cross-extending front piece 16d (see FIGURE 4).

The above represents the final latching position, since pipe members 13 or 13' cannot be rotated with respect to each other by reason of the opposed side edges *a* and *c* of the latch 16 which define side limit stops for the latching tongue 19. In this position, however, somewhat horizontal, pivotal movement between the pipe members 13 and 13' may be accommodated by reason of the clearance spacing between opposed side edges of the latching lug 19 and edges *a* and *c* of the latch 16 and the convex shape of the edge *b* which rides against the front face of the latching tab 19. Also, somewhat vertical tilting movement is made possible and accommodated by reason of the spacing between the front flange portion 12a and the tab 19 in its maximum forward, fully latched position. The outward slope of the lug 19, however, prevents the latching tab 19 from backwardly-clearing the edge *c* for turning movement past the edge *d* when the pipe members are tilted vertically with respect to each other after they have been assembled. For unlatching clearance purposes, it is necessary to fully move the pipe member 13' inwardly until the latching tab 19 abuts the rim 12a in a straight line relation.

From the above, it appears that the latch or latching bracket part 16 has a pair of peripherally spaced-apart mounting legs 16a and 16g that are secured on an outer face or wall of the open mouth portion 12 of the housing body part 10, and also has a front end connecting tab or cross-extending closure piece 16d. One leg, such as the left-hand leg 16a of the latching bracket 16, is shown as having a forward portion 16b that is offset, upwardly or radially-outwardly with respect to the housing body part 10 and with respect to a forward portion 16e of opposite or right-hand leg 16g and with respect to front connecting piece 16d, to move by a clockwise rotation or turn-in and a counterclockwise rotation or turn-out of the latching tab 19 with respect to confined or enclosed latching area of latch 16, when the nose part 18 is in a maximum "in" position within the open mouth portion 12, as limited by the engagement of the lug 19 with the front flange portion 12b. That is, after the nose part 18 is inserted into the open mouth portion 12 of the housing body part 10 with its latching tab or tongue 19 at a maximum inward position in abutment with the front edge or flange 12b of the body part, to the left of the latch 16, the nose part 18 may then be turned or rotated clockwise until the latching tab 19 is substantially centered in the enclosed rectangular spacing defined within the latch 16 and with the front end flange 12b. The nose part 18 is limited in its turning movement by the inward radial or downward offsetting of the opposite right-hand leg 16g of the latch 16. The front connecting piece 16d of the latch is also downwardly or radially-inwardly offset in such a manner that when the nose part 18 is then moved or pulled axially or longitudinally-outwardly or forwardly with respect to the housing body part 10, its latching tab 19 will engage inner convex edge *b* and, in such a position, cannot be turned either clockwise or counterclockwise, as limited by opposed edges *a* and *c*.

The joint can only be disconnected by moving the nose part 18 inwardly with respect to the housing body 10 until its latching tab 19 substantially abuts front flange 12b of the housing body 10 and thus, clears the front left-hand connecting portion 16b of the latch 16, whereby the nose part 18 can be turned counterclockwise to clear the latch, and the nose part 18 and its associated pipe 13' can then be withdrawn from within the housing body part 10.

Although the final step of the latching operation has been described as accomplished by a pull-out movement of the pipe member 13' with respect to the pipe member 13, it will be apparent that this can be accomplished automatically when the parts of the coupling are in the intermediate (dotted line) relation of FIGURE 6 of the drawings by utilization of outward pressure force of the fluid when introduced into the pipe members. The unlatching and separation of the pipe members can only be accomplished when fluid pressure has been released; it is accomplished in reverse order wherein the two pipe members 13 and 13' are moved or pushed inwardly with respect to each other, one pipe member 13' is turned relative to the other pipe member 13 counterclockwise to clear the latch 16, and finally is pulled straight outwardly until the nose part 18 is fully out of the mouth portion 12 of the housing body part 10.

It is apparent that the coupling construction will retain a fluid tight relation and, at the same time, have adjustable flexibility when fluid pressure is released for limited or controlled radial tilting to accommodate the assembly for uneven terrain. There is no danger of accidental release of the coupled relation during the application of fluid pressure and the coupled relation is retained in such a manner to assure an effective fluid seal accomplished by the gasket 14. Although the latch 16 is constructed for clockwise latching and counterclockwise unlatching operation, it will be apparent that the operations may be reversed by reversing the positions of the legs 16a and 16g of the latch 16. It will be noted that although relative tilting of the conduits 13 and 13' with respect to each other is permissible to accommodate for terrain contour, it is not required for effecting a latching or unlatching of the assembly and, cannot be employed to latch or unlatch the assembly.

The latch has one leg of a pair of peripherally-spaced mounting legs that is radially or upwardly offset to permit the latching lug to bypass or enter and leave an enclosed latching area defined by the latch and a front edge or flange of the open mouth portion when the nose part is in a maximum pushed-in relation with respect to the housing body part and is being rotated with respect thereto. The latch also has a front cross-extending piece connecting the forward ends of the legs; such piece and the legs have forward confining or stop limit edges that are engaged by the latching lug in a forwardly-pulled, positively-latched position within the latching area. The latching area not only prevents turning the latching lug out of position when it is in its maximum forward position, but also provides for radial pivoting of the nose part within the open mouth portion of the body part. A slight clearance spacing between side edges of the legs and side edges of the latching lug, an inward convexing of the back edge of the front end piece, and a slight forward inclination of the stabilizing part enables the nose part to be pivoted within the open mouth portion about its longitudinal axis within and with respect to the housing body part. As a result, the joint or coupling in its fully latched relation provides for some pivoting of one conduit member with respect to the other but as controlled or limited by the latching assembly and the stabilizing part.

Although a particular embodiment has been illustrated for the purpose of acquainting the art with the inventive concept, it will be apparent to those skilled in the art that various modifications, changes and additions may be made to the disclosed structure without departing from the spirit and scope of the invention.

I claim:

1. In a quick connect and release push, turn and pull type of latching coupling for removably-securing adjacent open end portions of a pair of fluid conduit members in a fluid-carrying connected relation wherein, a housing body part has a front open mouth portion and a back portion secured to an end portion of one conduit, a hollow nose part has a back portion secured to an end portion of the other conduit to fit within the open mouth portion of the housing body part, and a resilient annular gasket is carried within the open mouth portion to afford a fluid-tight seal between the housing body part and the nose part; the improvement which comprises: a radially inwardly-projecting front flange about the open mouth portion, a latch of bifurcated shape having a pair of peripherally spaced-apart legs secured to a top portion of the housing body part and projecting forwardly-outwardly from the open mouth portions, said latch having a front end piece connecting forward ends of said legs together, said latch defining an enclosed forwardly-positioned substantially rectangular latching area with the front flange of the open mouth portion, a single tab-like latching lug on a back end of said nose part and concavely-curved in a backward-upward direction therefrom, one of said legs having a radially upwardly-offset portion adjacent the front flange of said open mouth portion to pass said latching lug thereunder into the latching area when the nose part is inserted into and rotated with respect to said housing body part, said latch having forwardly-positioned confining edges for said latching lug preventing relative rotation between the nose and housing body parts when the nose part is thereafter moved outwardly until said latching lug is in a final latched position forwardly in engagement with said front end piece, said latching lug and said latch being adapted to provide for limited sidewise-horizontal pivotal movement between the nose and housing body parts and for preventing axial-outward and sidewise pivotal separation of the conduit members with respect to each other when said latching lug is in its final latched position within said latch, a stabilizing base of shovel-nose shape secured to and projecting forwardly in an angular relation from a lower area of the open mouth portion and in a downwardly-opposed relation with respect to said latch and providing for angular movement of the nose part with respect to the housing body part, said stabilizing base having portions for guiding the nose part endwise into the open mouth portion, and said latching lug extending radially above said front end piece a distance sufficient to maintain its engagement therewith when the nose part is tilted a maximum distance permitted by the angular relation of said stabilizing base for positively retaining said latching lug in its final latched position against release by downward angular tilting movement of the other conduit and the nose part within the open portion of and with respect to the housing body part.

2. In a latching coupling as defined in claim 1, said concavely-curved latching lug engaging said front flange for limiting the amount of insertion of the nose part within the open mouth portion to a position in which said latching lug may be rotated underneath said one leg into and out of the latching area, and for limiting upward tilting of said nose part with respect to the housing body part when said latching lug is in its final latched position within said latch.

3. In a latching coupling as defined in claim 1, said latch having a backwardly-convex inner edge along its front end piece, said latching lug having a convex backward under face defining a substantially planar cross-extending line-contact with said backwardly-convex inner edge of said latch for sidewise horizontal tilting movement thereon, said latching lug also having opposed substantially vertically-planar side edges which have a relatively close clearance defining relation with opposed inner side edges of said latch for retaining said latching lug in its final latched position, and one side of said latch being connected to said one leg by an inner step-like shoulder edge that spaces an inner side edge of the upwardly-offset portion of said one leg relatively widely with respect to said latching lug adjacent said front flange, whereby said latching lug will have a relatively wide clearance-spaced relation with respect thereto when the nose part is moved axially-forwardly within the open mouth portion to release said latching lug from its final latched position and permit its rotative movement out of said latch by an under-outward movement thereof adjacent said front flange and past said one leg.

References Cited

UNITED STATES PATENTS

| | | | |
|---|---|---|---|
| 2,066,008 | 12/1936 | Knoerzer | 285—6 |
| 2,327,572 | 8/1943 | Wallis | 285—6 |
| 3,331,620 | 7/1967 | Rickard | 285—5 |

FOREIGN PATENTS

| | | |
|---|---|---|
| 1,410,519 | 8/1965 | France. |
| 604,378 | 5/1960 | Italy. |

EDWARD C. ALLEN, Primary Examiner

D. W. AROLA, Assistant Examiner

U.S. Cl. X.R.

285—27